June 12, 1962     T. I. HARRIS ET AL     3,038,378
VARIABLE FOCAL LENGTH OPTICAL OBJECTIVE
Filed Jan. 12, 1959     3 Sheets-Sheet 1
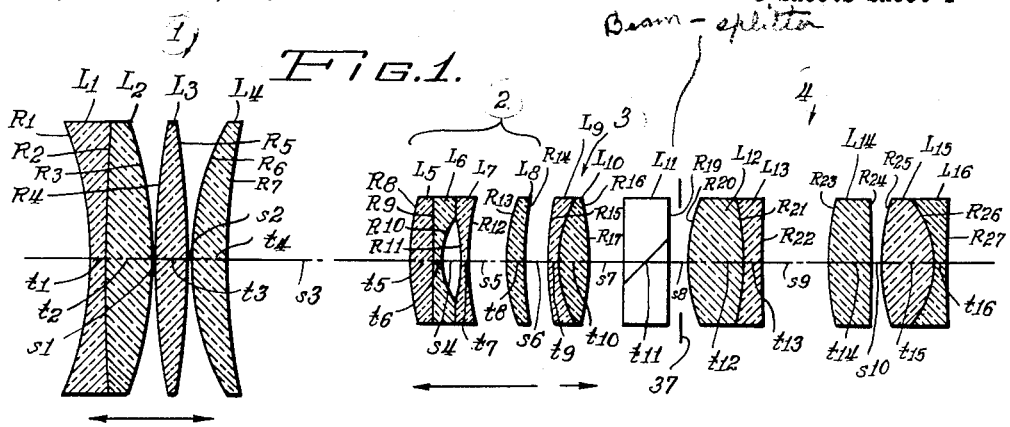
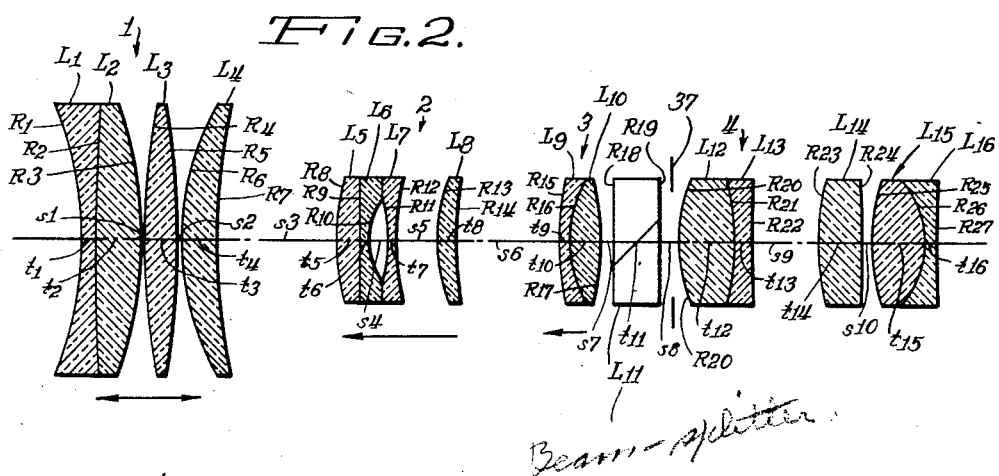
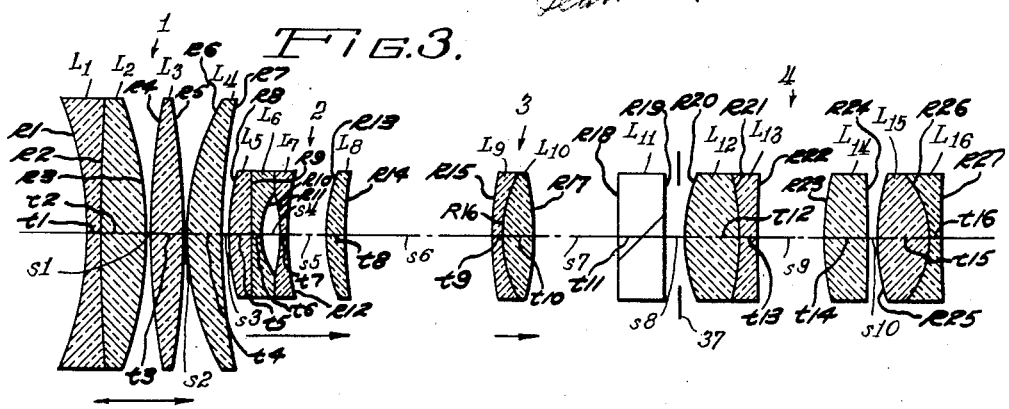
Inventors
Thomas I. Harris
Walter J. Johnson
By Robert F. Miehle, Atty.

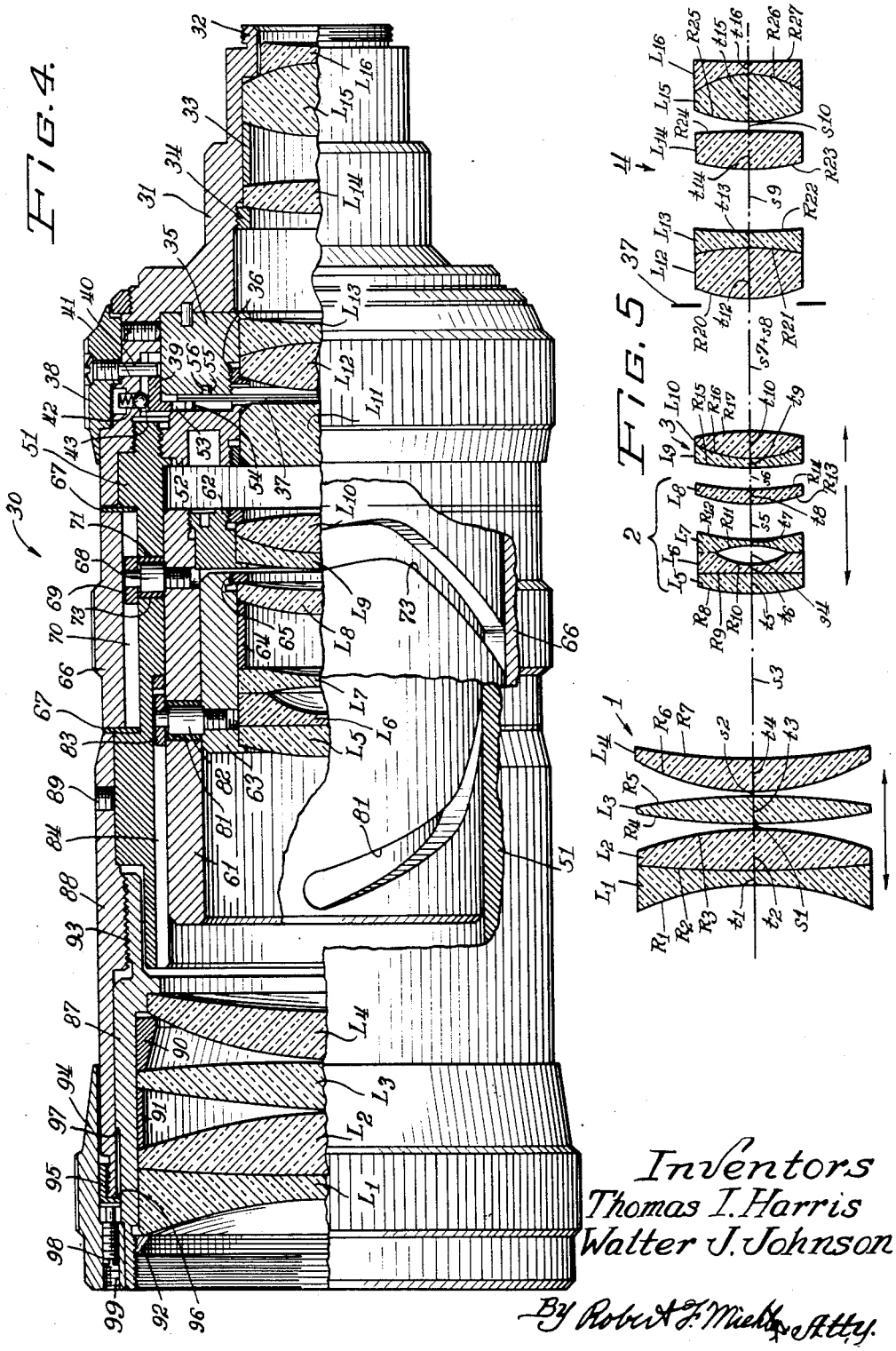

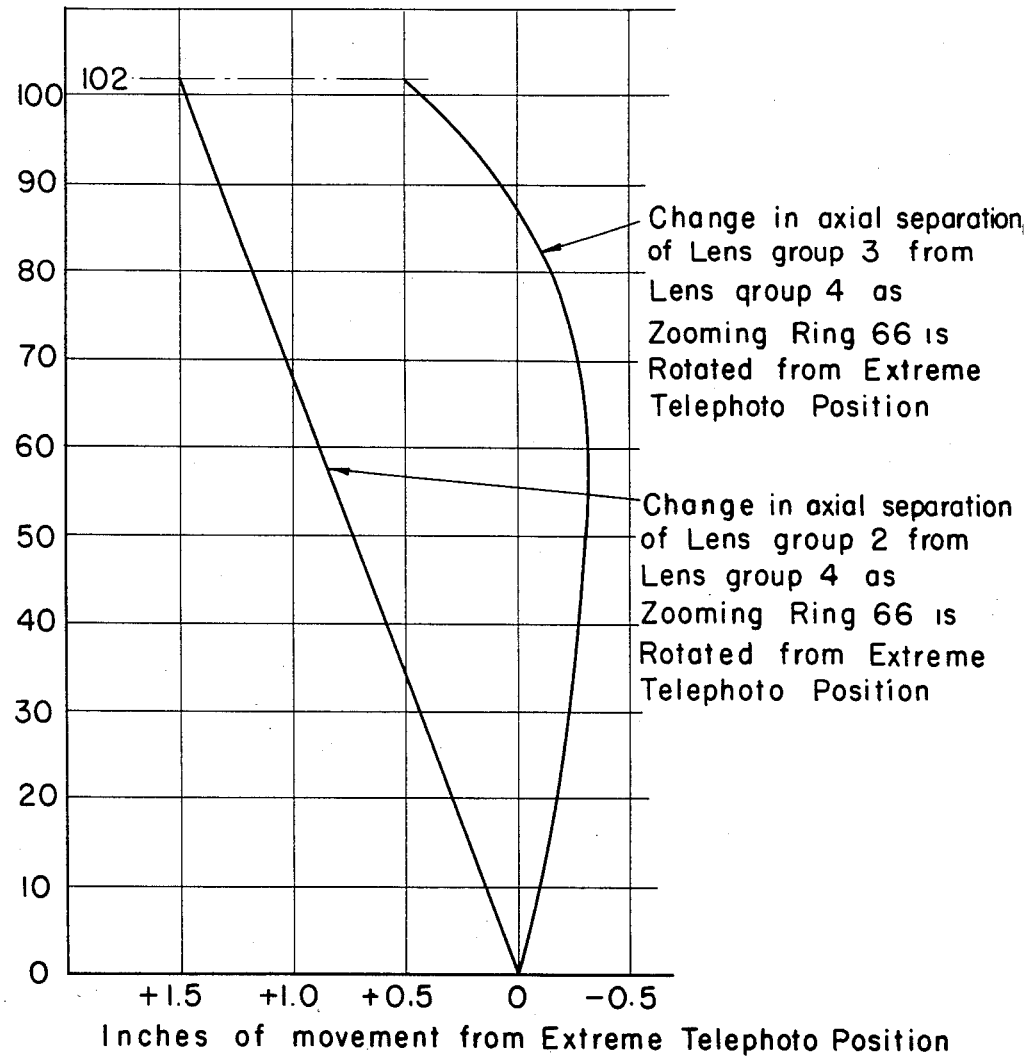

United States Patent Office 3,038,378
Patented June 12, 1962

3,038,378
VARIABLE FOCAL LENGTH OPTICAL OBJECTIVE
Thomas I. Harris and Walter J. Johnson, Mundelein, Ill., assignors to Bell & Howell Company, Chicago, Ill., a corporation of Illinois
Filed Jan. 12, 1959, Ser. No. 786,309
3 Claims. (Cl. 88—57)

This invention relates to a variable focal length optical objective primarily intended for photographic use but applicable for general optical purposes as well.

An object of the invention is the provision of a new and improved zoom optical objective in which the focus of the objective may be rapidly adjusted through a wide range.

Another object of the invention is to provide an optical objective in which the equivalent focal length may be varied over a four to one range while maintaining a high degree of optical correction throughout the range and with very little change in back focal length.

A further object of the invention is to provide a zoom lens system in which both primary and higher order spherical aberration, coma, astigmatism, field curvature, distortion and axial and lateral chromatic aberrations are highly corrected in all focal length adjustments and variation of distortion is minimized to not materially greater than one percent.

It is to be understood that the terms "front" and "rear" as used herein refer to the ends of the objective respectively nearer the longer and shorter conjugates thereof.

In the accompanying drawings forming a part hereof:

FIG. 1 is a sectional view of an optical objective of the spherical type having a beam splitter and forming one embodiment of the invention adjusted for one equivalent focal length;

FIG. 2 is a sectional view of the objective shown in FIG. 1 adjusted to another equivalent focal length;

FIG. 3 is a sectional view of the objective shown in FIG. 1 adjusted to still another equivalent focal length;

FIG. 4 is a longitudinal sectional view of the objective shown in FIG. 1 showing a mechanical mounting and adjusting mechanism for the objective;

FIG. 5 is a sectional view of the optical objective shown in FIG. 1 but omitting the beam splitter; and FIG. 6 is a graph illustrating movements of lens groups of the objective.

The invention provides a zoom lens objective comprising four components in which there is provided a rear component fixed relative to the image plane, a front component and a second component immediately behind the front component is adjacent to and movable axially to the front component to provide change in magnification and a third component is positioned between the second component and the rear component and is adjustable in a non-linear manner. The front component may be adjusted to provide slight changes in focus to accommodate the objective for different object distances.

Referring to the drawings, the zoom optical objective shown therein includes a positive, spherical, front group of lenses or component 1, a negative, spherical, second group of lenses or component 2, a positive, spherical third group of lenses or component 3, and a positive spherical, fourth group of lenses or component 4. The front lens group 1 is adjustable to focus from three feet to infinity but, during zooming is fixed. The front lens group is composed of lenses $L_1$ to $L_4$ having radii of curvatures of optical surfaces $R_1$ to $R_7$, thicknesses $t_1$ to $t_4$ and axial separations $s_1$ and $s_2$. The lenses $L_1$ and $L_2$ comprise a negative meniscus doublet and is shown as a cemented doublet thought it may be of the air separated, edge contact type if desired. The lens $L_3$ is a positive singlet and the lens $L_4$ is a positive meniscus singlet. The shapes of these lenses $L_1$ to $L_4$ are so chosen as to minimize coma and variation of distortion as well as higher order spherical aberration.

The negative second lens group 2 includes lenses $L_5$ to $L_8$ having optical surfaces $R_8$ to $R_{14}$ with axial separations $s_4$ and $s_5$ and axial thicknesses $t_5$ to $t_8$. The lens group 2 is axially adjustable as a unit relative to the lens group 1 to vary the axial separation $s_3$ by a lens mount 30 (FIG. 4) to vary the magnification of the objective. The lens group 2 is composed of three members the first of which is a cemented doublet formed by lenses $L_5$ and $L_6$ whose cemented surface is largely responsible for the small variation of distortion. Following this doublet are the lenses $L_7$ and $L_8$, which are separated by a relatively long air space which reduces the coma and higher order spherical aberration. The lens $L_7$ is in edge contact with the lens $L_6$. The lens $L_7$ is shaped so that the variation of aperture aberrations of its surface substantially reduce the variations of aperture aberrations of the cemented surface of the cemented lenses $L_5$ and $L_6$.

The third lens group 3 includes lenses $L_9$ and $L_{10}$ forming a doublet which is shown as cemented but also may be of the air separated type. The lenses $L_9$ and $L_{10}$ have axial thicknesses $t_9$ and $t_{10}$ with variable axial separations $s_6$ and $s_7$ respectively between the component 1. There also is included a beam splitter $L_{11}$, which may be omitted, if desired, and is disclosed and claimed in copending application Serial No. 780,026 filed December 12, 1958, by Walter J. Johnson and assigned to the same assignee as the present application. The beam splitter is provided for the purpose of view finding, is fixed relative to the lens group 4, and is separated from the component 4 by axial separation $s_8$. The beam splitter has plano optical surfaces $R_{18}$ and $R_{19}$, and is positioned in a portion of the objective in which the rays are substantially collimated.

The rear lens group 4 is positive, and includes lenses $L_{12}$ to $L_{16}$ having radii of curvature of optical surfaces $R_{20}$ to $R_{27}$, axial thicknesses $t_{12}$ to $t_{16}$ and axial separations $s_9$ and $s_{10}$. The lenses $L_{12}$ and $L_{13}$ are shown as a positive meniscus, cemented doublet, but may also be an air separated doublet. The lenses $L_{15}$ and $L_{16}$ also form a positive meniscus doublet and are shown in the cemented form but may be of the air separated type. The lens $L_{14}$ is a biconvex singlet. The rear lens group 4 is fixed relative to the focal plane, and is a three member derivative of the Petzval type in which the last two members, composed of a singlet $L_{14}$ and a doublet $L_{14}$ and a doublet $L_{15}$ and $L_{16}$, correct the astigmatism, distortion, lateral color and oblique spherical aberration, while the first member $L_{12}$ and $L_{13}$ balances the spherical aberration, coma and axial color of the system.

During zooming, the separation between lens groups 1 and 2 is varied manually to provide the change in magnification while the separation between lens groups 2 and 3 is changed to permit a constant position for the fixed lens group 4. Although not essential to the invention, in the preferred form of this invention lens groups 1 and 4 are fixed with respect to the final image plane during zooming, lens group 2 is moved linearly in the direction shown in FIG. 1 while component 3 is moved in a non-linear manner and with changing direction. Because lens group 2 in its median position is working at approximately 1:1 conjugates, the movement of lens group 3 is small with respect to the movement of lens group 2. Focusing of the system for finite object distances may be accomplished by moving component 1 forward. During use, the component 1 is adjusted for a finite object distance and then the components 2 and 3 may be adjusted to vary magnification without change in back focal length.

In FIG. 4 of the drawings there is shown an adjustable mount 30. The mount 30 includes a casing 31 having a threaded bushing portion 32 adapted to be screwed into fixed position in a camera (not shown). The lenses $L_{14}$, $L_{15}$ and $L_{16}$ are fixed in the casing by the bushing portion 32, a spacer bushing 33 and a retaining ring 34. The lenses $L_{12}$ and $L_{13}$ are fixed in the casing by a pinned insert 35, and are secured in the insert by a retaining ring 36. A diaphragm or stop 37 of the iris type positioned between the lenses $L_{11}$ and $L_{12}$ may be adjusted manually by a knurled ring 38 suitably marked, calibrated and mounted rotatably on the casing 31. The ring 38 is connected to an iris ring 39 by a pin 40 extending through a slot 41 in the casing 31. A spring-pressed ball detent 42 seating in one of slots 43 holds the stop 37 in adjusted position. A sleeve 51 is threaded into the front end of the casing 31 and has an insert 52 threaded thereinto and mounting the beam splitter $L_{11}$. The insert 52 has cam slots 53 for pins 54 of the stop 37, and the insert 35 has holes 55 for pins 56 of the stop. An elongated sleeve-like guide 61 mounted slidably and rotatably in the sleeve 51 carries the lenses $L_9$ and $L_{10}$ fixedly thereon by means of a mounting ring 62 threaded thereinto, and carries a lens mounting sleeve 63 slidably and rotatably therein. The sleeve 63 carries the lenses $L_5$ to $L_8$ fixedly therein by means of a spacer 64 and a locking ring 65.

To zoom or change magnification of the objective, a knurled zooming ring 66 is rotated manually on the sleeve 51 in guide rings 67, and turns the guide 61 therewith by means of a pin 68 fixed to the guide 61 and splined to the zooming ring 66 by a key 69 slidable in a longitudinal keyway 70 in the zooming ring. The pin carries a rotatable bearing sleeve 71, and projects through a cam slot 73 extending partially around the sleeve 51. As the zooming ring is turned from the position thereof shown in FIG. 4, in which the objective has an equivalent focal length of 76 mm., the guide 61 is first moved to the right, as viewed in FIG. 4, to move the lenses $L_9$ and $L_{10}$ to the right at a rate of speed non-linear relative to the rate of turning movement of the zooming ring 66 until the lenses $L_9$ and $L_{10}$ reach their farthest righthand positions, in which positions they are adjusted for an equivalent focal length of 46 mm. Then, on continued turning of the zooming ring 66, the guide 61 with the lenses $L_9$ and $L_{10}$ are moved back to the left again at a non-linear rate of speed until, at the limit of travel of the zooming ring, the lenses $L_9$ and $L_{10}$ are at their extreme lefthand positions as shown in broken lines in FIG. 4, in which positions the lenses $L_9$ and $L_{10}$ are properly positioned for an equivalent focal length of 19 mm. of the objective. During the entire adjustment of the guide 61 and lenses $L_9$ and $L_{10}$ first to the right and then to the left, the lens mounting sleeve 63 is moved continuously to the left at a rate of speed linear with respect to the rate of turning of the zooming ring 66 to keep the component 2 in proper position at all positions of the component 3 for perfect focus of the objective. That is, as the component 2 is moved to change the magnification, the component 3 is moved non-linearly relative thereto to keep the objective always in focus at the film plane. The movement of the mounting sleeve 63 is effected by a cam slot 81 in the guide 61 and a pin 82 which is fixed to the sleeve 63 and splined to the sleeve 51 by a key 83 slidable in keyway 84. The cam slot 81 is so shaped to compensate for the non-linearity of the movement of the guide 61 and make the movement of the sleeve 63 linear relative to the fixed outer sleeve 51.

An end sleeve is fixed to the sleeve 51 by a set screw 89, and a lens mounting barrel 87 carrying the lens group 1 by means of spacers 90 and 91 and a locking ring 92 is manually adjustable therein by multiple pitch thread segments 93 to adjust the component 1 for any equivalent focal length of the objective between 3 feet and infinity. The barrel 87 is rotated by means of a focusing ring 94 keyed to the barrel. To prevent accidental removal of the barrel during focusing movement of the lens group 1, an overhanging lip 96 of a collar 95 projects inwardly beyond a shoulder 97 of the barrel 87. This limits the short focus adjustment. To precisely provide for focusing for infinity, an adjustment screw 98 threaded through a bore 99 in the ring 94 is set at the factory, and engages the collar 95 to limit movement of the component 1 to the right to the position shown in the drawing in which the objective is focused at infinity.

The axial movements of the lens groups 2 and 3 relative to the lens group 4 are illustrated in the chart or graph of FIG. 6. The lens group 2 moves linearly away from the extreme long equivalent focal length or telephoto position to the extreme wide angle position while the lens group 3 initially moves closer to the lens group 4 and then away from the lens group 4 in accordance with the curve shown in FIG. 6. The ordinate of the graph shown in FIG. 6 represents degrees of movement of zooming ring 66 from the extreme telephoto adjustment.

In the preferred form of this invention, the equivalent focal length or magnification may be varied over a 4:1 range, maintaining a high degree of optical correction over the f/1.9 aperture throughout the range. Specifically, spherical aberration (both third and higher order), coma, astigmatism, field curvature, distortion, and axial and lateral color are more highly corrected in all focal length positions than in other lenses of this type. Variation of distortion is not materially greater than one percent.

Specifically, with reference to the equivalent focal lengths $f_1$, $f_2$, $f_3$ and $f_4$ of the respective components 1, 2, 3 and 4, the radii must conform to the following:

$$\frac{1}{-.65f_1} < \frac{1}{R_1} < 0$$

$$0 < \frac{1}{R_2} < \frac{1}{f_1}$$

$$\frac{1}{-.7f_1} < \frac{1}{R_3} < 0$$

$$0 < \frac{1}{R_4} < \frac{1}{.8f_1}$$

$$\frac{1}{-f_1} < \frac{1}{R_5} < 0$$

$$\frac{1}{1.2f_1} < \frac{1}{R_6} < \frac{1}{.4f_1}$$

$$0 < \frac{1}{R_7} < \frac{1}{f_1}$$

$$0 < \frac{1}{R_8} < \frac{1}{-f_2}$$

$$\frac{1}{2f_2} < \frac{1}{R_9} < \frac{1}{-.5f_2}$$

$$\frac{1}{-f_2} < \frac{1}{R_{10}} < \frac{1}{-.4f_2}$$

$$\frac{1}{f_2} < \frac{1}{R_{11}} < 0$$

$$0 < \frac{1}{R_{12}} < \frac{1}{-.9f_2}$$

$$0 < \frac{1}{R_{13}} < \frac{1}{-.9f_2}$$

$$\frac{1}{2f_2} < \frac{1}{R_{14}} < \frac{1}{-2f_2}$$

$$0 < \frac{1}{R_{15}} < \frac{1}{.5f_2}$$

$$\frac{1}{f_3} < \frac{1}{R_{16}} < \frac{1}{.2f_3}$$

$$\frac{1}{-.5f_3} < \frac{1}{R_{17}} < \frac{1}{-3f_3}$$

$$\frac{1}{2f_4} < \frac{1}{R_{20}} < \frac{1}{.7f_4}$$

$$-\frac{1}{.7f_4} < \frac{1}{R_{21}} < \frac{0}{-2f_4}$$

$$\frac{1}{-4f_4} < \frac{1}{R_{22}} < \frac{1}{2f_4}$$

$$\frac{1}{4f_4} < \frac{1}{R_{23}} < \frac{1}{f_4}$$

$$\frac{1}{-f_4} < \frac{1}{R_{24}} < \frac{1}{-4f_4}$$

$$\frac{1}{1.2f_4} < \frac{1}{R_{25}} < \frac{1}{.5f_4}$$

$$\frac{0}{-.3f_4} < \frac{0}{R_{26}} < \frac{0}{-f_4}$$

$$0 < \frac{1}{R_{27}} < \frac{1}{1.5f_4}$$

It is intended that the general scope of this invention cover those forms wherein one or more of the components are compounded.

A preferred embodiment of the objective shown in FIG. 1 is constructed substantially in accordance with the following table in which the component 1 is focused for infinity, dimensions are in terms of inches, values of the equivalent focal length and separations $s_3$, $s_6$ and $s_7$ correspond to the respective zooming adjustments shown in FIGS. 1, 2 and 3, and in which the indices of refraction for the sodium D line and the Abbe dispersion numbers are respectively designated as $n_d$ and V:

$$f_1 = 3.4158 \quad f_2 = -.9025 \quad f_3 = 3.3670 \quad f_4 = 1.7285$$

Equivalent focal length = $\begin{cases} 2.967 \text{ (Fig. 1) Telephoto} \\ 1.479 \text{ (Fig. 2) Mean} \\ .741 \text{ (Fig. 3) Wide angle} \end{cases}$ back focal length = .6493

Relative Aperture = f/1.9

|  |  |  |  |  |
|---|---|---|---|---|
| $L_1$ | $R_1 = -2.960$ | $t_1 = .150$ | $n_d = 1.720$ | V = 29.3 |
|  | $R_2 = +15.3893$ |  |  |  |
| $L_2$ |  | $t_2 = .420$ | $n_d = 1.020$ | V = 60.3 |
|  | $R_3 = -3.3485$ |  |  |  |
|  |  | $s_1 = .014$ |  |  |
|  | $R_4 = +5.2225$ |  |  |  |
| $L_3$ |  | $t_3 = .320$ | $n_d = 1.700$ | V = 47.8 |
|  | $R_5 = -20.008$ |  |  |  |
|  |  | $s_2 = .014$ |  |  |
|  | $R_6 = +2.400$ |  |  |  |
| $L_4$ |  | $t_4 = .320$ | $n_d = 1.620$ | V = 60.3 |
|  | $R_7 = +5.2225$ |  |  |  |

$s_3 \begin{cases} = 1.6791 \text{ (Fig. 1) Telephoto} \\ = 1.1394 \text{ (Fig. 2) Mean} \\ = .0670 \text{ (Fig. 3) Wide angle} \end{cases}$

|  |  |  |  |  |
|---|---|---|---|---|
| $L_5$ | $R_8 = +1.925$ | $t_5 = .200$ | $n_d = 1.751$ | V = 27.7 |
|  | $R_9 = \infty$ |  |  |  |
| $L_6$ |  | $t_6 = .080$ | $n_d = 1.617$ | V = 55.0 |
|  | $R_{10} = -.5720$ |  |  |  |
|  |  | $s_4 = .160$ |  |  |
|  | $R_{11} = -2.280$ |  |  |  |
| $L_7$ |  | $t_7 = .080$ | $n_d = 1.700$ | V = 41.1 |
|  | $R_{12} = +1.336$ |  |  |  |
|  |  | $s_5 = .400$ |  |  |
|  | $R_{13} = +1.477$ |  |  |  |
| $L_8$ |  | $t_8 = .160$ | $n_d = 1.720$ | V = 29.3 |
|  | $R_{14} = +2.960$ |  |  |  |

$s_6 \begin{cases} = .1349 \text{ (Fig. 1) Telephoto} \\ = .8990 \text{ (Fig. 2) Mean} \\ = 1.2782 \text{ (Fig. 3) Wide angle} \end{cases}$

|  |  |  |  |  |
|---|---|---|---|---|
| $L_9$ | $R_{15} = +3.025$ | $t_9 = .100$ | $n_d = 1.700$ | V = 47.8 |
|  | $R_{16} = +1.336$ |  |  |  |
| $L_{10}$ |  | $t_{10} = .250$ | $n_d = 1.517$ | V = 64.5 |
|  | $R_{17} = -2.500$ |  |  |  |

$s_7 \begin{cases} = .3319 \text{ (Fig. 1) Telephoto} \\ = .1075 \text{ (Fig. 2) Mean} \\ = .8007 \text{ (Fig. 3) Wide angle} \end{cases}$

|  |  |  |  |  |
|---|---|---|---|---|
| $L_{11}$ | $R_{18} = \infty$ | $t_{11} = .400$ | $n_d = 1.620$ | V = 60.3 |
|  | $R_{19} = \infty$ |  |  |  |
|  |  | $s_8 = .100$ |  |  |
|  | $R_{20} = +1.707$ |  |  |  |
| $L_{12}$ |  | $t_{12} = .300$ | $n_d = 1.580$ | V = 41.0 |
|  | $R_{21} = -1.500$ |  |  |  |
| $L_{13}$ |  | $t_{13} = .150$ | $n_d = 1.751$ | V = 27.7 |
|  | $R_{22} = +13.361$ |  |  |  |
|  |  | $s_9 = .700$ |  |  |
|  | $R_{23} = +3.489$ |  |  |  |
| $L_{14}$ |  | $t_{14} = .200$ | $n_d = 1.620$ | V = 60.3 |
|  | $R_{24} = -4.001$ |  |  |  |
|  |  | $s_{10} = .300$ |  |  |
|  | $R_{25} = +1.422$ |  |  |  |
| $L_{15}$ |  | $t_{15} = .460$ | $n_d = 1.620$ | V = 60.3 |
|  | $R_{26} = -.890$ |  |  |  |
| $L_{16}$ |  | $t_{16} = .120$ | $n_d = 1.751$ | V = 27.7 |
|  | $R_{27} = +4.170$ |  |  |  |

The objective shown in FIG. 5 is identical with that shown in FIGS. 1 to 4 except that the objective shown in FIG. 5 does not include the beam splitter $L_{11}$ of the viewfinder, an optically separate viewfinder of known construction (not shown) being used therewith. Also, the spacing $s_7 + s_8$ between the lenses $L_{10}$ and $L_{12}$ of the objective of FIG. 5 is different to compensate for the removal of the lens $L_{11}$ and may be either shorter or longer. A preferred example of the objective shown in FIG. 5 is constructed in compliance with the following table in which the component 1 is adjusted for focus of infinity, dimensions are in terms of inches, $L_1$ to $L_{10}$ and $L_{12}$ to $L_{16}$ are the lenses, $R_1$ to $R_{17}$ and $R_{20}$ to $R_{27}$ the respective radii of curvature of the surfaces, $t_1$ to $t_{10}$ and $t_{12}$ to $t_{16}$ the axial thicknesses, $s_1$ to $s_{10}$ the axial separations, $n_d$ the indices of refraction for the sodium D line and V the Abbe dispersion numbers, and in which values of the equivalent focal length and separations $s_3$, $s_7 + s_8$ are given for the two extremes and an intermediate adjustment of the objective:

$$f_1 = 3.4158 \quad f_2 = -.9025 \quad f_3 = 3.3670 \quad f_4 = 1.7285$$

Equivalent focal length = $\begin{cases} 2.967 \text{ Telephoto} \\ 1.479 \text{ Mean} \\ .741 \text{ Wide angle} \end{cases}$ back focal length = .6493

|  |  |  |  |  |
|---|---|---|---|---|
| $L_1$ | $R_1 = -2.960$ | $t_1 = .150$ | $n_d = 1.720$ | V = 29.3 |
|  | $R_2 = +15.3893$ |  |  |  |
| $L_2$ |  | $t_2 = .420$ | $n_d = 1.620$ | V = 60.3 |
|  | $R_3 = -3.3485$ |  |  |  |
|  |  | $s_1 = .014$ |  |  |
|  | $R_4 = +5.2225$ |  |  |  |
| $L_3$ |  | $t_3 = .320$ | $n_d = 1.700$ | V = 47.8 |
|  | $R_5 = -20.008$ |  |  |  |
|  |  | $s_2 = .014$ |  |  |
|  | $R_6 = +2.400$ |  |  |  |
| $L_4$ |  | $t_4 = .320$ | $n_d = 1.620$ | V = 60.3 |
|  | $R_7 = +5.2225$ |  |  |  |

$s_3 \begin{cases} 1.6791 \text{ Telephoto} \\ 1.1394 \text{ Mean} \\ .0670 \text{ Wide angle} \end{cases}$

|  |  |  |  |  |
|---|---|---|---|---|
| $L_5$ | $R_8 = +1.925$ | $t_5 = .200$ | $n_d = 1.751$ | V = 27.7 |
|  | $R_9 = \infty$ |  |  |  |
| $L_6$ |  | $t_6 = .080$ | $n_d = 1.617$ | V = 55.0 |
|  | $R_{10} = +.5720$ |  |  |  |
|  |  | $s_4 = .160$ |  |  |
|  | $R_{11} = -2.280$ |  |  |  |
| $L_7$ |  | $t_7 = .080$ | $n_d = 1.700$ | V = 41.1 |
|  | $R_{12} = +1.336$ |  |  |  |
|  |  | $s_5 = .400$ |  |  |
|  | $R_{13} = +1.477$ |  |  |  |
| $L_8$ |  | $t_8 = .160$ | $n_d = 1.720$ | V = 29.3 |
|  | $R_{14} = +2.960$ |  |  |  |

$s_6 \begin{cases} .1349 \text{ Telephoto} \\ .8990 \text{ Mean} \\ 1.2782 \text{ Wide angle} \end{cases}$

|  |  |  |  |  |
|---|---|---|---|---|
| $L_9$ | $R_{15} = +3.025$ | $t_9 = .100$ | $n_d = 1.700$ | V = 29.3 |
|  | $R_{16} = +1.336$ |  |  |  |
| $L_{10}$ |  | $t_{10} = .250$ | $n_d = 1.517$ | V = 64.5 |
|  | $R_{17} = -2.500$ |  |  |  |

$$s_7+s_8 \begin{cases} .6788 \text{ Telephoto} \\ .4544 \text{ Mean} \\ 1.1476 \text{ Wide angle} \end{cases}$$

| | | | | |
|---|---|---|---|---|
| $L_{12}$ | $R_{20}=+1.707$ | $t_{12}=.300$ | $n_d=1.580$ | $V=41.0$ |
| | $R_{21}=-1.500$ | $t_{13}=.150$ | $n_d=1.751$ | $V=27.7$ |
| $L_{13}$ | $R_{22}=+13.361$ | $s_9=.700$ | | |
| $L_{14}$ | $R_{23}=+3.489$ | $t_{14}=.200$ | $n_d=1.620$ | $V=60.3$ |
| | $R_{24}=-4.001$ | $s_{10}=.300$ | | |
| $L_{15}$ | $R_{25}=+1.422$ | $t_{15}=.460$ | $n_d=1.620$ | $V=60.3$ |
| $L_{16}$ | $R_{26}=-.890$ | $t_{16}=.120$ | $n_d=1.751$ | $V=27.7$ |
| | $R_{27}=+4.170$ | | | |

While the invention is thus described, it is not to be limited to the precise details described, as changes may be readily made without departing from the spirit of the invention.

What is claimed is:

1. An optical objective of the zoom type comprising a positive front component; a negative second component positioned to the rear of the front component and axially adjustable to vary the magnification of the objective; a positive third component positioned to the rear of the second component and adjustable relative to the first and second components; a fixed positive rear component; said front component comprising a front cemented meniscus doublet, an intermediate singlet and a rear singlet; said second component comprising a front cemented meniscus doublet, an intermediate singlet and a rear positive meniscus singlet; said third component comprising a cemented doublet; said rear component comprising a front cemented meniscus doublet, an intermediate positive singlet and a rear cemented meniscus doublet; and further characterized in that said objective complies with the following limits in which $f_1$ to $f_4$ are the equivalent focal lengths of the front, second, third and rear components respectively, and beginning with the front end of the objective $R_1$ to $R_{27}$ designate the radii of curvature of the optical surfaces:

$$\frac{1}{-.65f_1} < \frac{1}{R_1} < 0$$

$$0 < \frac{1}{R_2} < \frac{1}{f_1}$$

$$\frac{1}{-.7f_1} < \frac{1}{R_3} < 0$$

$$0 < \frac{1}{R_4} < \frac{1}{.8f_1}$$

$$\frac{1}{-f_1} < \frac{1}{R_5} < 0$$

$$\frac{1}{1.2f_1} < \frac{1}{R_6} < \frac{1}{.4f_1}$$

$$0 < \frac{1}{R_7} < \frac{1}{f_1}$$

$$0 < \frac{1}{R_8} < \frac{1}{-f_2}$$

$$\frac{1}{2f_2} < \frac{1}{R_9} < \frac{1}{-5f_2}$$

$$\frac{1}{-f_2} < \frac{1}{R_{10}} < \frac{1}{-.4f_2}$$

$$\frac{1}{f_2} < \frac{1}{R_{11}} < 0$$

$$0 < \frac{1}{R_{12}} < \frac{1}{-.9f_2}$$

$$0 < \frac{1}{R_{13}} < \frac{1}{-.9f_2}$$

$$\frac{1}{2f_2} < \frac{1}{R_{14}} < \frac{1}{-2f_2}$$

$$0 < \frac{1}{R_{15}} < \frac{1}{.5f_2}$$

$$\frac{1}{f_3} < \frac{1}{R_{16}} < \frac{1}{.2f_3}$$

$$\frac{1}{-.5f_3} < \frac{1}{R_{17}} < \frac{1}{-3f_3}$$

$$\frac{1}{2f_4} < \frac{1}{R_{20}} < \frac{1}{.7f_4}$$

$$\frac{1}{-.7f_4} < \frac{1}{R_{21}} < \frac{1}{-2f_4}$$

$$\frac{1}{-4f_4} < \frac{1}{R_{22}} < \frac{1}{2f_4}$$

$$\frac{1}{4f_4} < \frac{1}{R_{23}} < \frac{1}{f_4}$$

$$\frac{1}{-f_4} < \frac{1}{R_{24}} < \frac{1}{-4f_4}$$

$$\frac{1}{1.2f_4} < \frac{1}{R_{25}} < \frac{1}{.5f_4}$$

$$\frac{1}{-.3f_4} < \frac{1}{R_{26}} < \frac{1}{-f_4}$$

$$0 < \frac{1}{R_{27}} < \frac{1}{1.5f_4}$$

$$f_1 > f_4$$
$$-f_2 < f_4$$
$$f_3 > f_4$$

2. An optical objective of the zoom type comprising a positive front lens group; a negative second lens group positioned to the rear of the front lens group and axially adjustable to vary the magnification of the objective; a positive third lens group positioned to the rear of the second lens group and adjustable relative to the first and second lens groups; a fixed positive rear lens group; and a beam splitter between the third and rear components; said front lens group comprising a front cemented doublet, and intermediate singlet and a rear singlet; said second lens group comprising a front cemented doublet, an intermediate singlet and a rear singlet; said third lens group comprising a cemented doublet; said rear lens group comprising a front cemented doublet, an intermediate positive singlet and a rear cemented doublet; and further characterized in that said objective complies substantially with the following table in which the dimensions are in terms of inches, and beginning with the front end of the objective $L_1$ to $L_{16}$ designate the lenses, $R_1$ to $R_{27}$ the radii of curvature of the surfaces, $t_1$ to $t_{16}$ the axial thicknesses, $s_1$ to $s_{10}$ the axial separations, $n_d$ the refractive indices for the D line, and V the Abbe dispersion numbers, and in which corresponding values in the order listed are provided for the equivalent focal length, $s_3$, $s_6$ and $s_7$ for adjustment, an intermediate adjustment and the other extreme adjustment of the second and third lens groups:

Equivalent focal length = $\begin{cases} 2.967 \text{ Telephoto} \\ 1.479 \text{ Mean} \\ .741 \text{ Wide angle} \end{cases}$ back focal length = $.6493$

| | | | | |
|---|---|---|---|---|
| $L_1$ | $R_1=-2.960$ | $t_1=.150$ | $n_d=1.720$ | $V=29.3$ |
| | $R_2=+15.3893$ | $t_2=.420$ | $n_d=1.620$ | $V=60.3$ |
| $L_2$ | $R_3=-3.3485$ | $s_1=.014$ | | |
| | $R_4=+5.2225$ | $t_3=.320$ | $n_d=1.700$ | $V=47.8$ |
| $L_3$ | $R_5=-20.008$ | $s_2=.014$ | | |
| | $R_6=+2.400$ | $t_4=.320$ | $n_d=1.620$ | $V=60.3$ |
| $L_4$ | $R_7=+5.2225$ | | | |

| | $R_8 = +1.925$ | $t_5 = .200$ | $n_d = 1.751$ | $V = 27.7$ |
|---|---|---|---|---|
| $L_5$ | $R_9 = \infty$ | $t_6 = .080$ | $n_d = 1.617$ | $V = 55.0$ |
| $L_6$ | $R_{10} = +.5720$ | $s_4 = .160$ | | |
| | $R_{11} = -2.280$ | $t_7 = .080$ | $n_d = 1.700$ | $V = 41.1$ |
| $L_7$ | $R_{12} = +1.336$ | $s_5 = .400$ | | |
| | $R_{13} = +1.477$ | $t_8 = .160$ | $n_d = 1.702$ | $V = 29.3$ |
| $L_8$ | $R_{14} = +2.960$ | | | |

$s_3\begin{cases}=1.6791 \text{ Telephoto}\\=1.1394 \text{ Mean}\\=.0670 \text{ Wide angle}\end{cases}$ $s_6\begin{cases}=.1349 \text{ Telephoto}\\=.8990 \text{ Mean}\\=.2782 \text{ Wide angle}\end{cases}$

| | $R_{15} = +3.025$ | $t_9 = .100$ | $n_d = 1.700$ | $V = 47.8$ |
|---|---|---|---|---|
| $L_9$ | $R_{16} = +1.336$ | $t_{10} = .250$ | $n_d = 1.517$ | $V = 64.5$ |
| $L_{10}$ | $R_{17} = -2.500$ | | | |

$s_7\begin{cases}=.3319 \text{ Telephoto}\\=.1075 \text{ Mean}\\=.8007 \text{ Wide angle}\end{cases}$

| | $R_{18} = \infty$ | $t_{11} = .400$ | $n_d = 1.620$ | $V = 60.3$ |
|---|---|---|---|---|
| $L_{11}$ | $R_{19} = \infty$ | $s_8 = .100$ | | |
| | $R_{20} = +1.707$ | $t_{12} = .300$ | $n_d = 1.580$ | $V = 41.0$ |
| $L_{12}$ | $R_{21} = -1.500$ | | | |
| $L_{13}$ | $R_{22} = +13.361$ | $t_{13} = .150$ | $n_d = 1.751$ | $V = 27.7$ |
| | $R_{23} = +3.489$ | $s_9 = .700$ | | |
| $L_{14}$ | $R_{24} = -4.001$ | $t_{14} = .200$ | $n_d = 1.620$ | $V = 60.3$ |
| | $R_{25} = +1.422$ | $s_{10} = .300$ | | |
| $L_{15}$ | $R_{26} = -.890$ | $t_{15} = .460$ | $n_d = 1.620$ | $V = 60.3$ |
| $L_{16}$ | $R_{27} = +4.170$ | $t_{16} = .120$ | $n_d = 1.751$ | $V = 27.7$ |

3. An optical objective of the zoom type comprising a positive front lens group; a negative second lens group positioned to the rear of the front lens group and axially adjustable to vary the magnification of the objective; a positive third lens group positioned to the rear of the second lens group and adjustable relative to the first and second lens groups; a fixed positive rear lens group; and a beam splitter between the third and rear components; said front lens group comprising a front cemented doublet, an intermediate singlet and a rear singlet; said second lens group comprising a front cemented doublet, an intermediate singlet and a rear singlet; said third lens group comprising a cemented doublet; said rear lens group comprising a front cemented doublet, and intermediate positive singlet and a rear cemented doublet, and further characterized in that said objective complies substantially with the following table in which the dimensions are in terms of inches and beginning with the front end of the objective $L_1$ to $L_{16}$ designate the lenses, $R_1$ to $R_{27}$ the radii of curvature of the surfaces, $t_1$ to $t_{16}$ the axial thicknesses, $s_1$ to $s_{10}$ the axial separations, $n_d$ the refractive indices for the sodium D line, and V the Abbe dispersion numbers, and in which the upper values of the equivalent focal length, $s_3$, $s_6$ and $s_7+s_8$ correspond to one extreme adjustment of the second and third lens groups, the middle values correspond to an intermediate adjustment and the lower values correspond to the other extreme adjustment:

Equivalent focal length $=\begin{cases}2.967 \text{ Telephoto}\\1.479 \text{ Mean}\\.741 \text{ Wide angle}\end{cases}$ back focal length $=.6493$

| | $R_1 = -2.960$ | $t_1 = .150$ | $n_d = 1.720$ | $V = 29.3$ |
|---|---|---|---|---|
| $L_1$ | $R_2 = +15.3893$ | $t_2 = .420$ | $n_d = 1.620$ | $V = 60.3$ |
| $L_2$ | $R_3 = -3.3485$ | $s_1 = .014$ | | |
| | $R_4 = +5.2225$ | $t_3 = .320$ | $n_d = 1.700$ | $V = 47.8$ |
| $L_3$ | $R_5 = -20.008$ | $s_2 = .014$ | | |
| | $R_6 = +8.400$ | $t_4 = .320$ | $n_d = 1.620$ | $V = 60.3$ |
| $L_4$ | $R_7 = +5.2225$ | | | |

$s_3\begin{cases}1.6791 \text{ Telephoto}\\1.1394 \text{ Mean}\\.0670 \text{ Wide angle}\end{cases}$

| | $R_8 = +1.925$ | $t_5 = .200$ | $n_d = 1.751$ | $V = 27.7$ |
|---|---|---|---|---|
| $L_5$ | $R_9 = \infty$ | $t_6 = .080$ | $n_d = 1.617$ | $V = 55.0$ |
| $L_6$ | $R_{10} = +.5720$ | $s_4 = .160$ | | |
| | $R_{11} = -2.280$ | $t_7 = .080$ | $n_d = 1.700$ | $V = 41.1$ |
| $L_7$ | $R_{12} = +1.336$ | $s_5 = .400$ | | |
| | $R_{13} = +1.477$ | $t_8 = .160$ | $n_d = 1.720$ | $V = 29.3$ |
| $L_8$ | $R_{14} = +2.960$ | | | |

$s_6\begin{cases}.1349 \text{ Telephoto}\\.8990 \text{ Mean}\\1.2782 \text{ Wide angle}\end{cases}$

| | $R_{15} = +3.025$ | $t_9 = .100$ | $n_d = 1.700$ | $V = 47.8$ |
|---|---|---|---|---|
| $L_9$ | $R_{16} = +1.336$ | $t_{10} = .250$ | $n_d = 1.517$ | $V = 64.5$ |
| $L_{10}$ | $R_{17} = -2.500$ | | | |

$s_7+s_8\begin{cases}.6788 \text{ Telephoto}\\.4544 \text{ Mean}\\1.1476 \text{ Wide angle}\end{cases}$

| | $R_{20} = +1.707$ | $t_{12} = .300$ | $n_d = 1.580$ | $V = 41.0$ |
|---|---|---|---|---|
| $L_{12}$ | $R_{21} = -1.500$ | | | |
| $L_{13}$ | $R_{22} = +13.361$ | $t_{13} = .150$ | $n_d = 1.751$ | $V = 27.7$ |
| | $R_{23} = +3.489$ | $s_8 = .700$ | | |
| $L_{14}$ | $R_{24} = -4.001$ | $t_{14} = .200$ | $n_d = 1.620$ | $V = 60.3$ |
| | $R_{25} = +.1422$ | $s_9 = .300$ | | |
| $L_{15}$ | $R_{26} = -.890$ | $t_{15} = .460$ | $n_d = 1.620$ | $V = 60.3$ |
| $L_{16}$ | $R_{27} = +4.170$ | $t_{16} = .120$ | $n_d = 1.751$ | $V = 27.7$ |

References Cited in the file of this patent

UNITED STATES PATENTS

| 2,649,025 | Cook | Aug. 18, 1843 |
| 2,718,817 | Back et al. | Sept. 27, 1955 |
| 2,843,016 | Reiss | July 15, 1958 |
| 2,847,907 | Angenieux | Aug. 19, 1958 |
| 2,859,654 | Back | Nov. 11, 1958 |
| 2,906,172 | Klemt | Sept. 29, 1959 |

FOREIGN PATENTS

| 26,896 | France | Sept. 28, 1860 |
| 1,120,271 | France | Oct. 14, 1957 |
| 1,123,471 | France | June 11, 1956 |